Sept. 11, 1945.  F. J. ALLGEO  2,384,586
LEVEL
Filed July 20, 1943   2 Sheets-Sheet 1

INVENTOR
Fred J. Allgeo
BY
ATTYS

Sept. 11, 1945.                F. J. ALLGEO                2,384,586
                                  LEVEL
                           Filed July 20, 1943            2 Sheets-Sheet 2
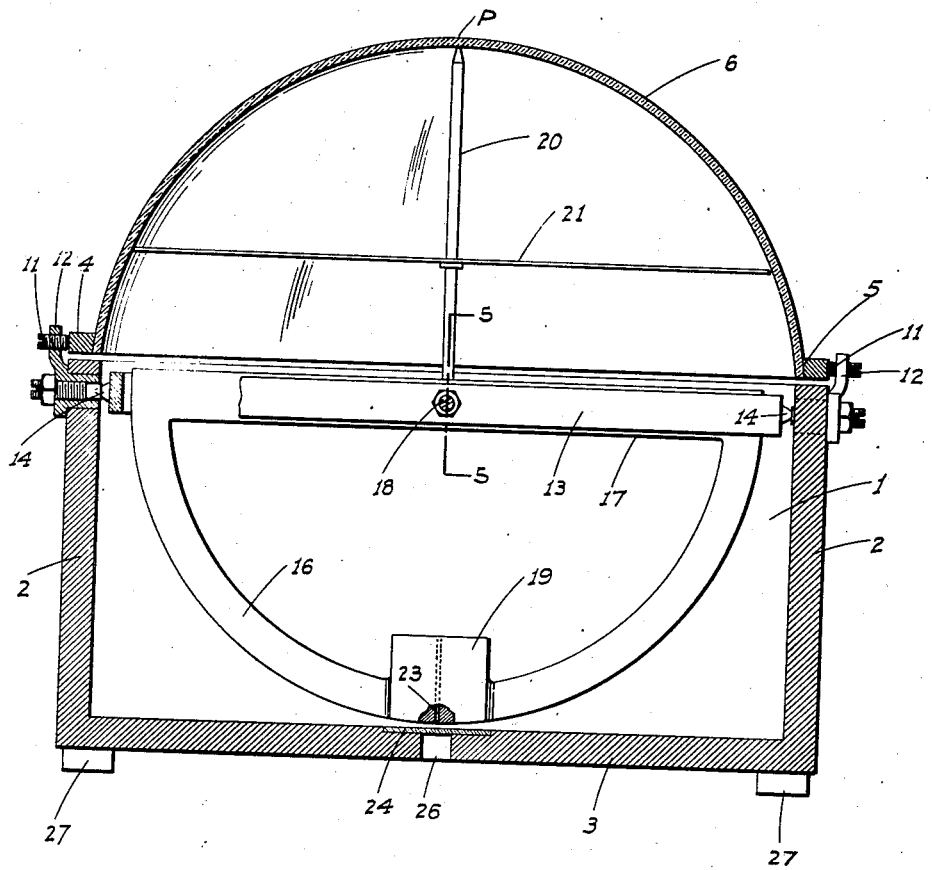
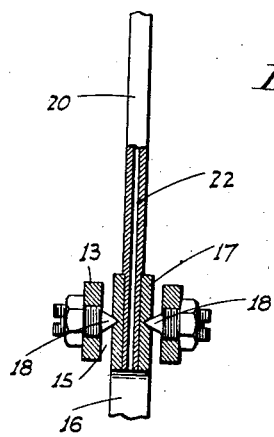
INVENTOR
Fred J. Allgeo
BY
*Worster Merbiter*
ATTYS Patented Sept. 11, 1945

2,384,586

UNITED STATES PATENT OFFICE 2,384,586

LEVEL

Fred J. Allgeo, San Francisco, Calif.

Application July 20, 1943, Serial No. 495,461

6 Claims. (Cl. 33—215)

This invention is directed to, and it is an object to provide, an improved mechanical gravity actuated level arranged to indicate deviations from a perpendicular or horizontal plane.

Another object of the invention is to provide a gravity actuated level, of the pendulum-type, which is constructed so that the friction error is negligible whereby accurate readings may be obtained.

A further object is to provide a level of the type described which is arranged for easy reading.

A still further object is to provide a level which, due to its construction, is adaptable to many and various uses, both commercial and military.

It is also an object to provide means whereby the scaled, transparent dome which the device includes, may be adjusted both vertically and horizontally so that an initial accurate setting can be obtained before each use of the device.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is a sectional elevation of the device.

Figure 5 is an enlarged fragmentary section on line 5—5 of Fig. 2.

Figure 1:
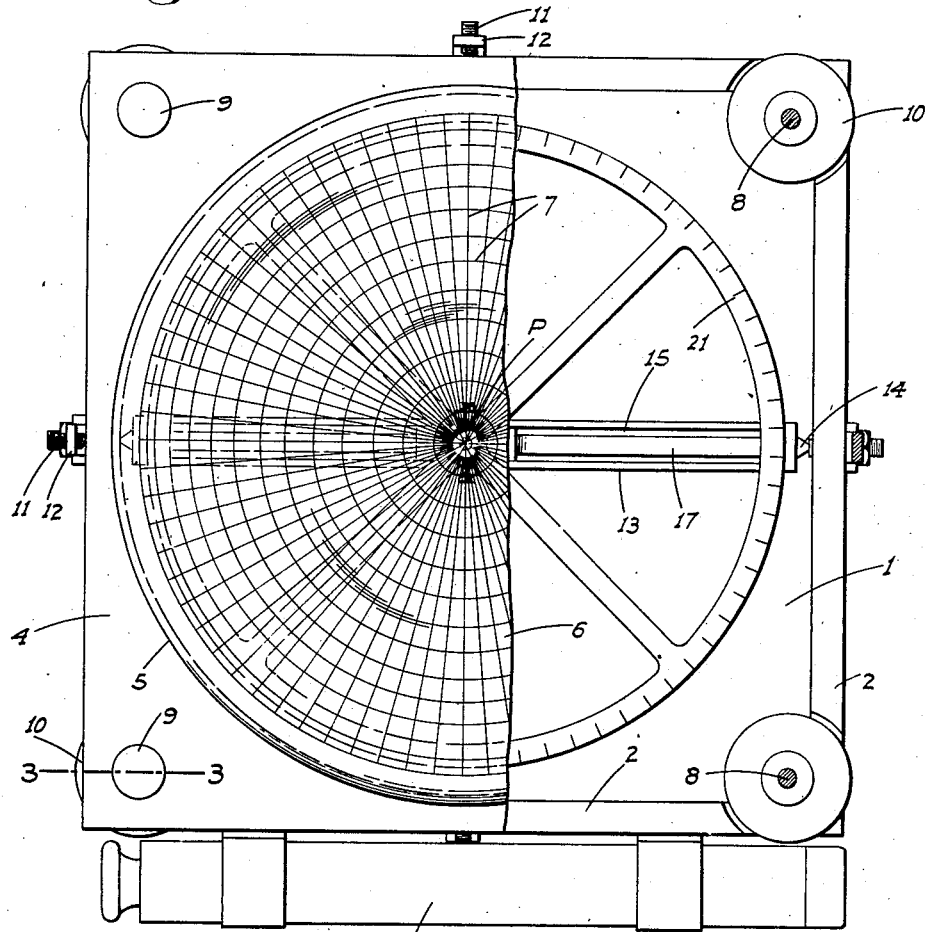
Figure 1 is a top plan of the device with the transparent scaled dome and its supporting plate partly broken away.
Figure 3:
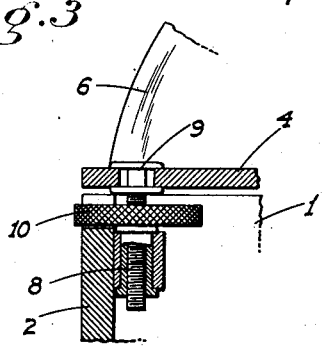
Figure 3 is an enlarged fragmentary cross section on line 3—3 of Fig. 1.
Figure 4:
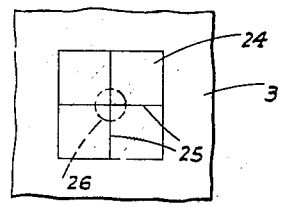
Figure 4 is a fragmentary bottom plan view of the cross hair arrangement as centered in the bottom of the device.

Referring now more particularly to the characters of reference on the drawings, the level comprises an initially open topped box 1 which is rectangular in plan and includes opposed, parallel and upstanding sides 2 and a bottom 3 at a right angle to said sides.

A cover plate 4, symmetrical to the box, is mounted thereon as a lid and includes a relatively large, centered opening 5 of circular form into which the lower edge of a substantially hemispherical dome 6 is secured. This dome is transparent and is scaled as at 7 in equally spaced circumferential and radial lines, said lines representing predetermined deviations in degrees reading from the top center point P of the dome. Any preferred scaling can be employed.

The plate 4 is supported at the corners for vertical adjustment by individual, vertically disposed adjustment screws 8, each of which include a horizontally grooved head 9 into which the cover engages in loose play relation horizontally to permit of lateral adjustment of the cover, as will hereinafter appear. A knurled actuating disc 10 on each screw 8 projects beyond the corners of the box for access.

The cover plate 4 is laterally adjustable by suitable means such as horizontal set screws 11 threaded through brackets 12 on the sides of and projecting above the box, said screws 11 engaging adjacent edges of said plate.

By means of screws 8 and 11 the plate 4, and consequently dome 6, can be adjusted in vertical as well as horizontal position.

The gravity actuated, universally mounted, pendulum assembly which the device includes, comprises the following:

A cross beam 13 extends between opposite sides of the box, centrally between the other sides, and is supported at its ends by adjustable needle bearings 14; such beam 13 being slotted through from top to bottom, as at 15, for substantially its full length. A semi-circular pendulum 16 of skeleton protractor form and having a straight top bar 17, is disposed in the box with said bar in slot 15 and in clearance relation to adjacent portions of beam 13. Needle bearings 18 are mounted on beam 13 centrally of its end and on opposite sides to engage and support corresponding portions of bar 17 at a point equidistant between its ends.

The needle bearings 14 as well as needle bearings 18 are in vertical planes intersecting the top center point P of the scaled dome 6, and are in the same horizontal plane relative to each other.

The pendulum includes a pendulum weight 19 centered at the bottom thereof. An upstanding pointer is mounted in centered relation on the bar 17, and projects upwardly to a termination adjacent and reading on the scaled dome 6. A spider supported, degree graduated ring 21, concentric to the pointer 20, is mounted on and supported by the latter intermediate its ends; the ring being of a diameter to clear the inner surface of said dome at all times. Either the pointer 20 or ring 21 can be read on the sealed dome.

The pointer 22 is tubular, as at 22, and open ended, the lower end opening through the bar 17 as clearly shown in Fig. 5. The pendulum weight 19 is formed with a bore 23 alined with tubular pointer 20, and a transparent plate 24 marked with cross hairs 25 is seated in the bottom 3 of the box over an aperture 26. The point of intersection of said cross hairs 25 is in vertical alinement with the center point P at the top of the dome. Feet 27 support the box 1 so that light can pass thereunder.

In use the box 1 is disposed on the object whose level is to be checked, and the device is then read, selectively, by reading pointer 20 against the scaled dome, or reading scaled ring 21 against the scaled dome, or by sighting through tubular pointer 20 and bore 23 in weight 19 to read against the cross hairs 25.

As a convenience for the user, a small telescope T may be mounted on the level alongside the box 1 adjacent the top thereof.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A mechanical gravity actuated level comprising an initially open topped box, a hemispherical dome mounted on the box at the top and opening to the interior thereof, said dome being transparent and having a scale thereon, a cross beam extending from side to side of the box, bearings supporting said beam at opposite ends for rotation about its longitudinal axis, a pendulum including an upstanding pointer and a depending weight, and bearing means pivotally mounting said pendulum intermediate its ends on said beam for swinging movement in a plane lengthwise of the latter, the axis of the beam and the axis of the pendulum being at a right angle to each other in a horizontal plane and intersecting at the center point of the dome; there being a scaled ring concentrically surrounding and supported by the pointer intermediate its ends, said ring being of substantial diameter and the periphery of the ring being closely adjacent the inner surface of said dome.

2. A mechanical gravity actuated level comprising an initially open topped box, a hemispherical dome mounted on the box at the top and opening to the interior thereof, said dome being transparent and having a scale thereon, a cross beam extending from side to side of the box, bearings supporting said beam at opposite ends for rotation about its longitudinal axis, said beam being slotted through from top to bottom for substantially its full length, a semi-circular pendulum having a straight top bar and including a pointer upstanding from the bar and a weight at the bottom of the semi-circular portion, the top bar being disposed lengthwise in said slot in clearance relation, and bearing means pivoting the bar centrally of its ends in the slot for swinging movement in a plane lengthwise of the latter, the axis of the beam and the axis of the pendulum being at a rigid angle to each other in a horizontal plane, and intersecting at the central point of the dome; the pointer being tubular and open at both ends, the lower end of the pointer opening through said bar, the weight having a bore alined with the tubular pointer, and a transparent pane having cross-hairs marked thereon disposed over an aperture in the bottom of the box, the point of intersection of the cross hairs being vertically alined with the top center point of the dome.

3. A mechanical, gravity actuated level comprising an initially open topped box, a transparent scale-marked hemispherical dome disposed on top of the box, and means mounting said dome on the box for vertical or horizontal adjustment, selectively; said means including a cover plate supporting the dome, vertically adjustable screws supporting the plate adjacent its corners, and horizontally adjustable set screws engaging the edges of said plate between said corners.

4. A mechanical, gravity actuated level comprising an initially open topped box, a transparent scale-marked hemispherical dome disposed on top of the box, and means mounting said dome on the box for vertical or horizontal adjustment, selectively; said means including a cover plate supporting the dome, vertically adjustable screws supporting the plate adjacent its corners, and horizontally adjustable set screws engaging the edges of said plate between said corners, the vertically adjustable screws being connected to said plate so as to limit relative vertical movement but to permit of a certain horizontal movement.

5. A mechanical, gravity actuated level comprising an initially open topped box, a transparent scale-marked hemispherical dome mounted on top of the box, a pendulum assembly mounted in the box for universal movement about the center of the dome as an axis, said assembly including an upstanding pointer and a depending weight, a sighting bore extending through said assembly from top to bottom, the box having a central aperture in the bottom, and a transparent plate, having cross hairs therein, in register with said aperture; the point of intersection of said cross hairs being vertically alined with the top center point of the dome.

6. A mechanical, gravity actuated level comprising an initially open topped box, a transparent scale-marked hemispherical dome mounted on top of the box, a pendulum assembly mounted in the box for universal movement about the center of the dome as an axis, said assembly including an upstanding pointer and a depending weight, a sighting bore extending through said assembly from top to bottom, the box having a central aperture in the bottom, and a transparent plate, having cross hairs therein, in register with the aperture; the point of intersection of said cross hairs being vertically alined with the top center point of the dome, and the box having feet thereon to support the bottom of the box in clearance relation to the object on which the feet rest so as to permit light entry to said aperture.

FRED J. ALLGEO.